(12) United States Patent
Tanaka (10) Patent No.: US 8,059,317 B2
(45) Date of Patent: Nov. 15, 2011

(54) IMAGE READING APPARATUS AND IMAGE FORMING APPARATUS

(75) Inventor: Koichi Tanaka, Osaka (JP)

(73) Assignee: Kyocera Mita Corporation (JP)

( * ) Notice: Subject to any disclaimer, the term of this patent is extended or adjusted under 35 U.S.C. 154(b) by 533 days.

(21) Appl. No.: 12/234,852

(22) Filed: Sep. 22, 2008

(65) Prior Publication Data

US 2009/0086276 A1    Apr. 2, 2009

(30) Foreign Application Priority Data

Sep. 27, 2007    (JP) .................. 2007-252484

(51) Int. Cl.
*H04N 1/04*    (2006.01)

(52) U.S. Cl. ........ 358/498; 358/474; 358/486; 358/497; 358/496; 358/488

(58) Field of Classification Search .................. 358/474, 358/486, 497, 496, 498, 488
See application file for complete search history.

(56) References Cited

U.S. PATENT DOCUMENTS

| | | | | |
|---|---|---|---|---|
| 5,442,466 A * | 8/1995 | Kameyama et al. | ........... | 358/498 |
| 5,991,592 A * | 11/1999 | Kobayashi et al. | ........... | 358/496 |
| 6,930,808 B2 * | 8/2005 | Otani | ........... | 345/550 |
| 7,061,637 B2 * | 6/2006 | Mochimaru et al. | ........ | 358/1.15 |
| 7,164,513 B2 * | 1/2007 | Fujii et al. | ........... | 358/498 |
| 7,495,810 B2 * | 2/2009 | Shiraishi | ........... | 358/474 |
| 7,518,763 B2 * | 4/2009 | Shiraishi et al. | ........... | 358/475 |
| 7,626,735 B2 * | 12/2009 | Mizuhashi et al. | ........... | 358/474 |
| 7,791,771 B2 * | 9/2010 | Shiraishi | ........... | 358/475 |
| 7,800,790 B2 * | 9/2010 | Kageyama et al. | ........... | 358/474 |
| 7,843,614 B2 * | 11/2010 | Iwago | ........... | 358/498 |
| 7,864,383 B2 * | 1/2011 | Shiraishi | ........... | 358/474 |
| 2005/0157327 A1 * | 7/2005 | Shoji et al. | ........... | 399/9 |
| 2006/0203300 A1 * | 9/2006 | Choi | ........... | 358/474 |
| 2008/0013133 A1 * | 1/2008 | Taguchi | ........... | 358/514 |
| 2008/0068681 A1 * | 3/2008 | Ishido | ........... | 358/498 |
| 2008/0088887 A1 * | 4/2008 | Morikawa | ........... | 358/447 |
| 2008/0273229 A1 * | 11/2008 | Morisawa | ........... | 358/498 |
| 2009/0002784 A1 * | 1/2009 | Morikawa | ........... | 358/520 |
| 2009/0027743 A1 * | 1/2009 | Han | ........... | 358/498 |

FOREIGN PATENT DOCUMENTS

| | | |
|---|---|---|
| JP | 2002271587 | 9/2002 |
| JP | 2007082033 | 3/2007 |

* cited by examiner

*Primary Examiner* — Twyler Haskins
*Assistant Examiner* — Helen Q Zong
(74) *Attorney, Agent, or Firm* — Gerald E. Hespos; Michael J. Porco (57) ABSTRACT

A document feeding section, a CCD which reads one side of a document conveyed by the document feeding section, a CIS which reads the other side of the document, a reversing mechanism which reverses the document, a document discharging tray, a first document conveying passage which connects a document tray and the CCD, a reverse document conveying passage which connects the CCD and the reversing mechanism, a re-conveying document conveying passage which connects the reversing mechanism and the first document conveying passage, and a discharging document conveying passage which branches out from the reverse document conveying passage and is connected to the document sheet-discharging tray, are provided, and a CIS which reads the other side of the document is provided in the discharging document conveying passage.

13 Claims, 3 Drawing Sheets

IMAGE READING APPARATUS AND IMAGE FORMING APPARATUS

BACKGROUND OF THE INVENTION

1. Field of the Invention

The present invention relates to an image reading apparatus which is capable of reading both sides of a document, and an image forming apparatus provided with the image reading apparatus.

2. Description of the Related Art

Conventionally, in image forming apparatuses such as a copying machine and a facsimile machine, front and back sides of a document is read automatically by an image reading apparatus provided with an automatic document feeding device (ADF: Automatic Document Feeder). In this document reading, a method of reading an image on a front side of a document with an image sensor, reversing the document front and back, and reading an image on a back side of the document with the image sensor again has been widely adopted.

Further, as shown in a patent document 1 (Japanese Patent Unexamined Publication No. 2007-82033), there has been a known image forming apparatus adopting a method of providing image sensors respectively for both front and back sides of a document in a document conveying passage from a document tray to substantially simultaneously reading both sides of the document at one document conveyance (one-path) without reversing the document. In the image forming apparatus adopting the method of substantially simultaneously reading both sides of the document, it is likely that reading a one side of the document is performed with a minification optical system image sensor provided on a side of an apparatus main body, and reading the other side of the document is performed with a contact type optical system image sensor provided on a side of the automatic document feeding device in view of installation space, cost, and the like.

If optical configurations of image sensors for reading front and back sides of a document are different from one another like the image forming apparatus shown in the patent document 1, a difference in image quality occurs in a read image due to difference in light sources and lens arrays used respectively. Further, the difference in image quality of the read images appear as a difference in image quality of images formed on the front and back sides of the recording sheet. Therefore, in such image forming apparatus, for the purpose of obtaining the same image quality on the front and back sides of the recording sheet, there are provided a double-sided reverse reading mode of reversing one sheet of document, conveying the document twice to the same image sensor (minification optical system image sensor), and allowing the image sensor to read front and back sides of the document, and a double-sided simultaneous reading mode of using two image sensors of a minification optical system and a contact type optical system to read front and back sides of the document substantially simultaneously to shorten an image reading time, so that a user can select a desired mode.

However, in the image forming apparatus shown in the patent document 1, as shown in its FIG. 12, the contact optical system image sensor for reading the other side of a document is provided on a document conveying passage at a position on a downstream side in a document conveying direction from the minification optical system image sensor for reading one side of the document and on an upstream side in the document conveying direction from the document reversing mechanism. In such image forming apparatus, the contact optical system image sensor is disposed in a loop of a circular document conveying passage (which is formed by a first document conveying passage for connecting the document tray and the minification optical system image sensor, a reverse document conveying passage connecting the minification optical system image sensor and the document reversing mechanism, and a re-conveying document conveying passage connecting the document reversing mechanism and the first document conveying passage) for putting a document back to the minification optical system image sensor again in the double-sided reverse reading mode. Therefore, the loop becomes large by a space for providing the contact optical system image sensor. This causes the conveying passage for putting the document back to the minification optical system image sensor again in the double-sided reverse reading mode to be long, so that a long time is required for reading a document in the double-sided reverse reading mode.

SUMMARY OF THE INVENTION

The present invention was made to solve the problem described above, and its object is to provide a configuration capable of simultaneously reading both sides of a document without requiring a long time for reading a document in a case where both sides of the document is read with front-and-back reversing.

In summary, an image reading apparatus according to an aspect of the present invention includes: a document feeding section which feeds a document placed on a document tray; a first reading section which reads one side of the document conveyed by the document feeding section; a reversing mechanism which reverses and conveys the document so that the other side of the document is to be read by the first reading section after the one side of the document is read; a document-discharging tray to which the document whose one or the other side is read by the first reading section is discharged; a first document conveying passage which guides the document conveyed from the document tray to the first reading section by the document feeding section; a reverse document conveying passage which guides the document conveyed from the first reading section to the reversing mechanism by the document feeding section; a re-conveying document conveying passage which connects the reversing mechanism and the first document conveying passage and guides the document conveyed from the reversing mechanism to the first document conveying passage by the document feeding section; a discharging document conveying passage which branches out from the reverse document conveying passage and guides the document which is conveyed to the document discharging tray by the document feeding section; and a second reading section which is provided in the discharging document conveying passage between a branching point and the document discharging tray and reads the other side of the document conveyed by the document feeding section.

These and other objects, features and advantages of the present invention will become more apparent upon reading of the following detailed description along with the accompanied drawings.

DESCRIPTION OF THE PREFERRED EMBODIMENTS

Hereinafter, an image reading apparatus and an image forming apparatus in accordance with an embodiment of the present invention will be described with reference to the drawings. In the embodiments described herebelow, an image reading apparatus and an image forming apparatus in accordance with the present invention will be described in a form of a complex machine having functions of a color copying machine, a scanner, a facsimile machine, and a printer.

Figure 1:
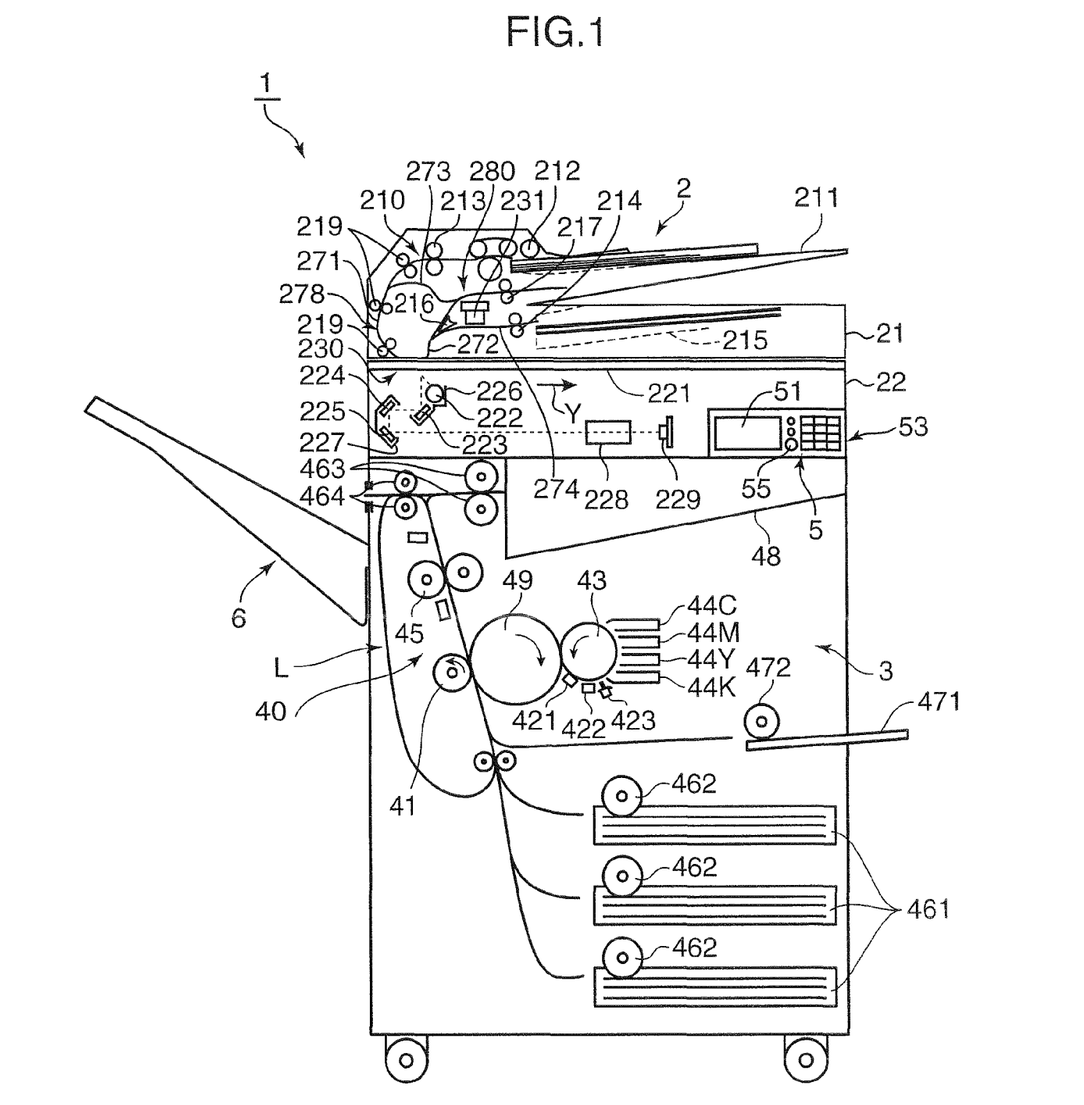
FIG. 1 is a vertical sectional view schematically showing an internal configuration of a complex machine which is an image forming apparatus in accordance with an embodiment of the present invention.

FIG. 1 is a vertical sectional view schematically showing an internal configuration of a complex machine 1 which is an image forming apparatus in accordance with an embodiment of the present invention.

The complex machine 1 includes an image reading apparatus 2 and an apparatus main body 3. The image reading apparatus 2 includes a document feeding section 21, a scanner section 22, a CIS 231, and an operating section 5, and further includes a reversing mechanism 280 and a controller 61 which will be described hereinafter.

The document feeding section 21 is provided with an ADF (Automatic Document Feeder) and includes a document tray 211, a pickup roller 212, a registration roller 213, a document conveying roller 219, a sheet-discharging roller 214, and a sheet-discharging tray 215. On the document tray 211, a document subjected to reading is placed. The document placed on the document tray 211 is taken by the pickup roller 212 one after another. A timing of conveying the document taken by the pickup roller 212 to the CIS 231 and the scanner section 22 is adjusted by the registration roller 213 in accordance with a progress of reading in the CIS 231 and the scanner section 22 and a position on a document conveying passage about a document which is started to be read precedingly. After adjusting the timing, the registration roller 213 starts conveying the document to the CIS 231 and the scanner section 22, and the document is conveyed on the document conveying passage 210 by each document conveying roller 219 provided in the document conveying passage 210. The document conveyed by each document conveying roller 219 in the document conveying passage 210 is discharged to the sheet-discharging tray 215 by the sheet-discharging roller 214.

The scanner section (an example of a first reading section) 22 optically reads an image of the document to generate image data. The scanner section 22 is provided in the apparatus main body 3. The scanner section 22 includes a platen glass 221, a light source 222, a first mirror 223, a second mirror 224, a third mirror 225, a first carriage 226, a second carriage 227, an imaging lens 228, and a CCD (Charge Coupled Device) 229. In the scanner section 22, a white fluorescent lamp such as a cold cathode fluorescent tube is used as the light source 222. The first mirror 223, the second mirror 224, the third mirror 225, the first carriage 226, the second carriage 227, and the imaging lens 228 lead a light from the document to the CCD 229. Since a white fluorescent lamp such as a cold cathode fluorescent tube is used as the light source 222 in the scanner section 22, a color reproductivity is better than that of the below-described CIS 231 adopting three-colored LED and the like as a light source.

The CIS (an example of a second reading section) 231 is provided on a downstream side in the document conveying direction from the scanner section 22. The CIS 231 is provided in the document conveying passage at such a position as to be capable of reading a side opposite to a document side which is to be read by the scanner section 22 document conveying passage.

On the platen glass 221, a document is manually placed by a user at a time of reading a document without the document feeding section 21.

The image reading apparatus 2 has document-reading methods including a flat-bed reading mode, in which the scanner section 22 reads a document placed on the platen glass 221, and an ADF reading mode, in which a document is taken in by the document feeding section 21 (ADF) and read while being conveyed. In the flat-bed reading mode, the light source 222 irradiates a light to the document placed on the platen glass 221, and a reflected light for one line in a main scanning direction is reflected sequentially by the first mirror 223, the second mirror 224, and the third mirror 225 and enters the imaging lens 228. The light incident to the imaging lens 228 is imaged on a receiving surface of the CCD 229. The CCD 229 is a one-dimensional image sensor and processes one line of a document image simultaneously. The first carriage 226 and the second carriage 227 are so configured as to be movable in a direction orthogonal to the main scanning direction (sub-scanning direction, the direction of an arrow Y). After reading of one line is terminated, the first carriage 226 and the second carriage 227 move in the direction orthogonal to the main scanning direction, and next reading of line is performed.

In the ADF reading mode, the document feeding section 21 takes in a document placed on the document tray 211 one after another with the pickup roller 212. At this time, the first carriage 226 and the second carriage 227 are arranged at positions under a reading window 230. When the document is conveyed by the document feeding section 21 and passes through the reading window 230 formed in the document conveying passage 210, the light source 222 irradiates a light to the document. A reflected light for one line in the main scanning direction is reflected sequentially by the first mirror 233, the second mirror 224, and the third mirror 225, and enters the imaging lens 228. The light incident to the imaging lens 228 is imaged on the receiving surface of the CCD 229. Next, the document is conveyed by the document feeding section 21, and the next line is read.

Further, the document feeding section 21 includes a reversing mechanism 280 configured by a switching guide 216, a reversing roller 217, and a reversing conveying passage 218. The reversing mechanism 280 reverses the document, whose front side (one side of the document) is read by the scanner section 22 at the first ADF reading, front and back and conveys the document again to the reading window 230 (scanner section 22), so that a back side (the other side of the document) is read again by the scanner section 22. The reversing mechanism 280 operates only at a time of double-sided reading, and it does not operate at a time of one-sided reading. After the one-sided reading, and reading of the back side in the double-sided reading, the switching guide 216 is switched to an upper side, and the document is discharged to the sheet-discharging tray 215 by the sheet-discharging roller 214. Further, after reading the front side in the double-sided reading, the switching guide 216 is switched to a lower side. The document conveyed by the document conveying roller 219 is conveyed to the reversing conveying passage 218 by a reverse rotation of the reversing roller 217, and then conveyed again to the reading window 230 (scanner section 22) by the conveying roller 219. Hereinafter, the mode of reading both sides of the document with the reversing mechanism 280 is named as a double-sided reverse-reading mode or a high image quality mode.

Further, in the ADF reading mode, the image reading apparatus 2 in accordance with the present embodiment is capable of allowing the scanner section 22 (CCD 229) to read a side of a document while the document is conveyed and read the back side of the document with the CIS 231. In this case, a side of the document conveyed from the document tray 211 by the document feeding section 21 is read by the CCD 229 when passing through a reading window 230, and the back side is read when passing through a position at which the CIS 231 is arranged. In the CIS 231, three-colored LED or the like of RGB is used as a light source.

By using the CCD 229 and the CIS 231 as described above, front and back sides of the document can be read by the document feeding section 21 with one document conveying operation (one-path) from the document tray 211 to the sheet-discharging tray 215. Hereinafter, the mode of using the CCD 229 and the CIS 231 to read both sides of the document will be named as a double-sided simultaneous-reading mode or a high-speed mode.

The high image quality mode (double-sided reverse-reading mode) and the high-speed mode (double-sided simultaneous-reading mode) will be described. In the high image quality mode, the double-sided document reading is performed by the same image sensor (CCD 229). Therefore, even if the double-sided printing is performed in accordance with obtained image data, there is no difference in image quality between both sides. However, in the high-speed mode, the front side of the document is read by the CCD 229, and the back side is read by the CIS 231, i.e. the reading is performed with different image sensors. Therefore, especially in the case of a color document, if the double-sided printing is performed in accordance with image data obtained respectively by the respective image sensors, image quality of print images on both sides becomes different. It is thought that such difference in image quality occurs because, in addition to the reason that difference in spectral distribution of the light sources which are used for the CCD 229 and the CIS 231 at the time of document reading, the CCD 229 is configured as an image sensor in which a plurality of receiving devices are formed on one chip, and on the other hand, the CIS 231 is configured as an image sensor in which a plurality of solid imaging devices are connected, causing irregularity in sensitivity of solid imaging devices.

Thus, in the complex machine 1 in accordance with the present embodiment, for the purpose of solving occurrence of the difference in image quality, it is so configured that a user can select one of the high image quality mode (double-sided reverse-reading mode) and the high-speed mode (double-sided simultaneous-reading mode) when the double-sided document reading is performed with the ADF reading mode. In other words, a user can select a mode according to a situation by selecting the high image quality mode (double-sided reverse-reading mode) in a case where a user would like to have equal image quality of print images on both sides, or selecting the high-speed mode (double-sided simultaneous-reading mode) in a case where a user would like to prioritize shortening of a reading time even if the image quality differs in print images on both sides.

Further, the complex machine 1 includes an apparatus main body 3 and a stack tray 6 provided on a left side of the apparatus main body 3. The apparatus main body 3 includes a plurality of sheet-feeding cassettes 461, sheet-feeding rollers 462 for conveying recording sheets one after another from the sheet-feeding cassette 461 to the recording section 40, and a recording section 40 for forming an image onto the recording sheets conveyed from the sheet-feeding cassettes 461. Further, a manual feeding tray 471 is provided. Sheets having a size which is not accommodated in any of the sheet-feeding cassettes, sheets in which an image is already formed on one side, and any recording mediums such as OHP sheets can be placed on the manual feeding tray 471, and the sheets are fed one after another by a sheet feeding roller 472 from the manual feeding tray 471 into the apparatus main body 3.

The recording section (image forming section) 40 includes a charge-removing device 421 for removing remaining electric charge from a surface of the photoconductive drum 43, a charging device 422 for charging the surface of the photoconductive drum 43 after removal of electric charge, an exposure device 423 for outputting laser light in accordance with image data obtained in the scanner section 22 for exposure of the surface of the photoconductive drum 43 to form an electrostatic latent image on the surface of the photoconductive drum 43, developing devices 44K, 44Y, 44M, and 44C for forming toner images of cyan (C), magenta (M), yellow (Y), and black (K) onto the photoconductive drum 43 in accordance with the electrostatic latent image, a transfer drum 49 onto which the toner images of respective colors formed on the photoconductive drum 43 are transferred and superimposed, a transferring device 41 for transferring the toner image formed on the transfer drum 49 to the sheet, and a fixing device for heating the sheet, onto which the toner image is transferred, to fix the toner image. The toners of respective colors of cyan, magenta, yellow, and black are supplied from an unillustrated toner-supply container (toner cartridge). Further, there are provided conveying rollers 463 and 464 for conveying the recording sheet passed through the recording section 40 to the stack tray 6 or the sheet-discharging tray 48.

In a case of forming images on both sides of a recording sheet, an image is formed on one side of the recording sheet in the recording section 40, and thereafter the recording sheet is nipped between the conveying rollers 463 on the side of the sheet-discharging tray 48. In this state, the conveying rollers 463 are reversely rotated so that the recording sheet is switched back. Then, the recording sheet is sent to a sheet conveying passage L and conveyed again to an upstream area of the recording section 40. After an image is formed on the other side in the recording section 40, the recording sheet is discharged to the stack tray 6 or the sheet-discharging tray 48.

Further, on a front side of the apparatus main body 3, there is provided an operating section having a display portion which allows a user to visually confirm an operation screen and various massages, and operation buttons for inputting various operation commands. The operating section 5 includes a display portion 51, a numerical key group 53, and a start button 55. The display portion 51 is configured by an LCD (Liquid Crystal Display), an ELD (Electronic Luminescent Display), or the like and displays guide screens for operations such as a sheet size selection, a magnification selection, a density selection, and the like with respect to a user. The display portion 51 is integrally formed with a touch panel. When a user performs a touch operation, the touch panel detects a touched position and outputs a detection signal to the controller which will be described herebelow.

The numerical key group 53 is operative to input the number of copies at a time when the copying function of the complex machine 1 is operated, and phone numbers of an addressee at a time when the facsimile is operated. For example, the start button 55 is a button which is operative to start the copying operation and the scanner operation.

Figure 2:
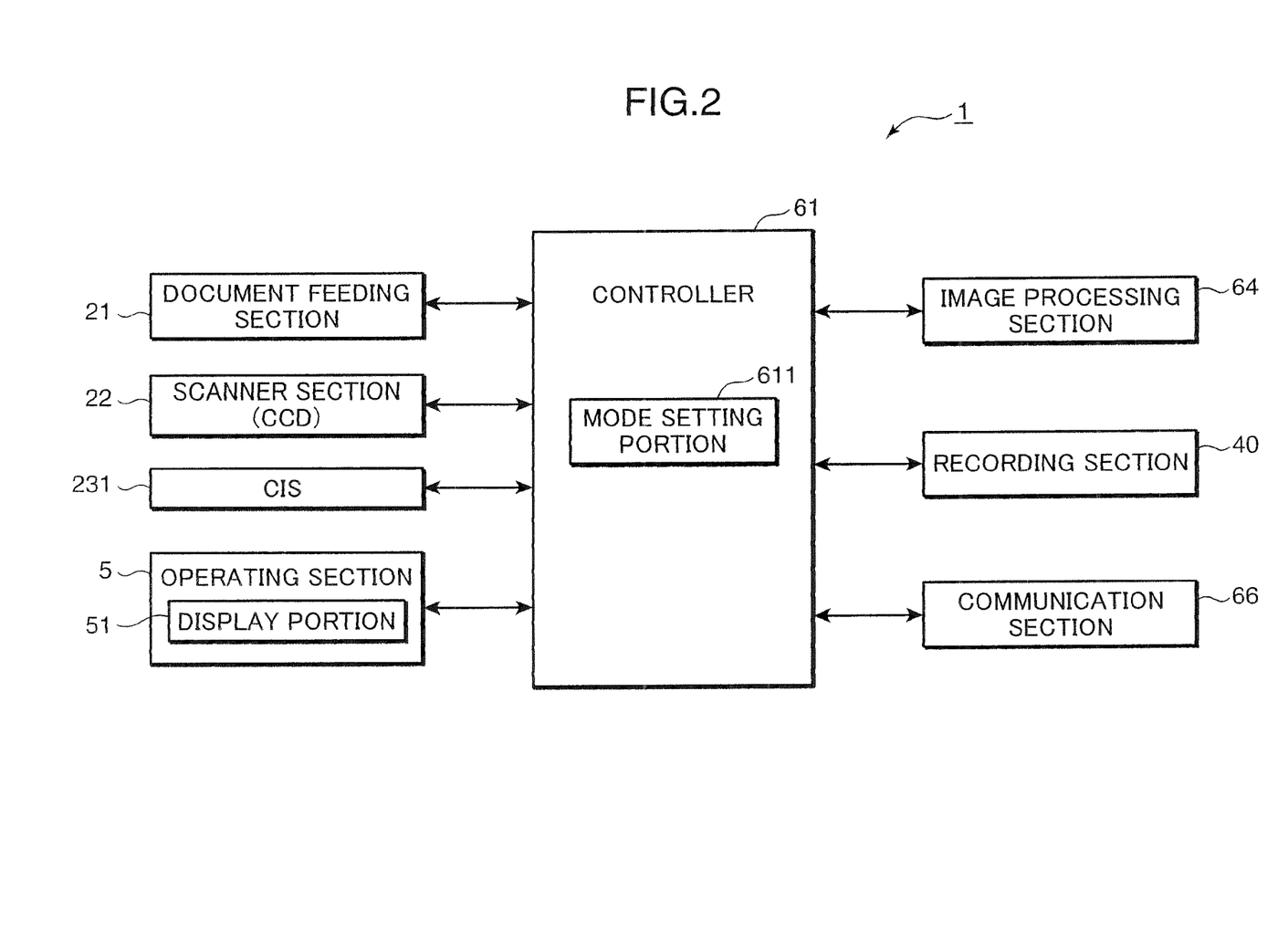
FIG. 2 is a block diagram showing an electric configuration of the complex machine.

FIG. 2 is a block diagram showing an electrical configuration of the complex machine 1. The elements which are the same as those shown in FIG. 1 is identified by the same reference numerals, and detailed description regarding those will be omitted.

The complex machine 1 is configured by the controller 61, the document feeding section 21, the scanner section 22, the CIS 231, the operating section 5, the image processing section 64, the recording section 40, and the communication section 66.

The controller 61 controls an overall operation of the complex machine 1 and is configured by a CPU and the like. The document feeding section 21, the scanner section 22, the CIS 231, the operating section 5, the image processing section 64, the recording section 40, and the communication section 66 are operated under a control executed by the controller 61. The controller 61 executes a processing based on an operation control program stored in an unillustrated ROM or HDD in accordance with various instruction signals inputted to the operating section 5 by a user, outputs the instruction signals to respective functional sections, and performs data transfer to totally control the complex machine 1.

The controller 61 includes a mode setting portion 611. The mode setting portion 611 stores predetermined operations and operation controls for relevant parts of the document feeding section 21, the scanner section 22, the CIS 231, and the reversing mechanism 280 in the double-sided reverse-reading mode and the double-sided simultaneous-reading mode described above. The mode setting portion 611 is operative to set which of operations of the double-sided reverse-reading mode or the double-sided simultaneous-reading mode is to be performed by the relevant section in accordance with mode selection instructions, which are the instructions of selecting which one of the double-sided reverse-reading mode and the double-sided simultaneous-reading mode, to be inputted by a user through operation to the operating section 5. The controller 61 controls the relevant sections to operate in a mode set by the mode setting portion 611. In the description herebelow, the scanner section 22 will be presented as the CCD 229.

The document feeding section 21 automatically takes in a document placed on the document tray 211 and conveys the document so as to be readable by the CCD 229 and the CIS 231 when copying and scanning of a document is performed in the ADF reading mode.

The display portion 51 is adapted to display various screens and displays a display screen in accordance with a display signal inputted from the controller 61.

The image processing section 64 is adapted to perform various image processing related to image data. For example, the image processing section 64 performs correction processing such as a level correction and a gamma correction, a compression or expanding processing with respect to image data, and image processing such as enlarging or reducing processing with respect to image data obtained by the CCD 229 or CIS 231, and image data transferred through a communication section 66 such as a personal computer connected to a network or a facsimile machine connected through a public phone line.

The recording section 40 forms on a recording sheet an image based on image data obtained by the CCD 229 or CIS 231 and image data transferred through the communication section 66 from a personal computer, a facsimile machine, and the like.

The communication section 66 is adapted to perform a transmission of various data between external devices such as a computer and facsimile machine connected through a network by using a network interface.

Figure 3:
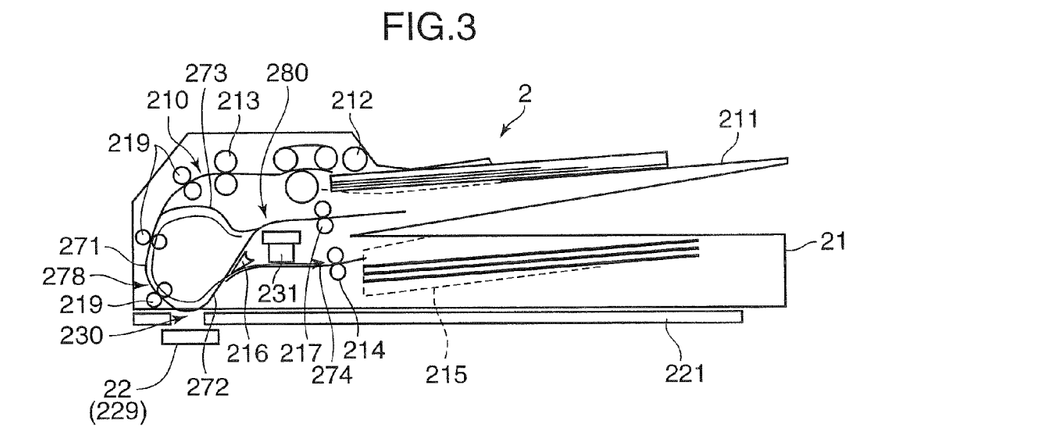
FIG. 3 shows details of a document conveying passage of the image reading apparatus.
Figure 4:
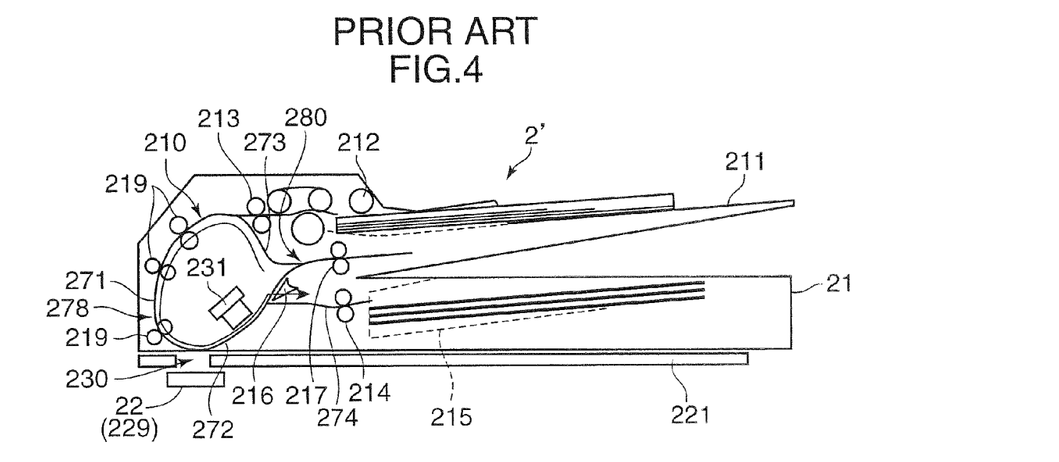
FIG. 4 shows details of a document conveying passage of a conventional image reading apparatus.

Next, arrangement of the document conveying passage and the CIS 231 of the image reading apparatus 2 will be described. FIG. 3 shows details of the document conveying passage of the image reading apparatus 2. FIG. 4 shows details of a document conveying passage of a conventional image forming apparatus 2'.

The document conveying passage 210 of the document feeding section 21 includes a first document conveying passage 271, a reverse document conveying passage 272, the above-described re-conveying document conveying passage 273, and a discharging document conveying passage 274.

The first document conveying passage 271 guides a document which is conveyed by the document conveying roller 219 of the document feeding section 21 from the document tray 211 to the CCD 229. The reverse document conveying passage 272 guides the document conveyed by the document conveying roller 219 from the CCD 229 to the reversing mechanism 280. The re-conveying document conveying passage 273 connects the reversing mechanism 280 and the first document conveying passage 271, and guides the document conveyed by the document conveying roller 219 from the reversing mechanism 280 to the first document conveying passage 271. The discharging document conveying passage 274 branches out from the reverse document conveying passage 272, and guides the document conveyed by the document conveying roller 219 from the CCD 229 to the document discharging tray 215. The switching guide 216 is provided at a branching position between the reverse document conveying passage 272 and the discharging document conveying passage 274 and performs switching to guide the document conveyed by the document conveying roller 219 to the reversing mechanism 280 or the document discharging tray 215.

The first document conveying passage 271, the reverse document conveying passage 272, and the re-conveying document conveying passage 273 form a circular document conveying passage 278. At a time when a document reading operation is performed in the double-sided reverse reading mode, the document conveying roller 219, the switching guide 216, and the reversing roller 217 allows the document taken by the pickup roller 212 from the document tray 211 into the first document conveying passage 271, for reading of front and back sides, to pass through the document reading window 230 (CCD 229) via the first document conveying passage 271, and then is conveyed to the reversing mechanism 280 via the reverse document conveying passage 272. Further, the document is conveyed from the reversing mechanism 280, passes through the re-conveying document conveying passage 273 to reach the first document conveying passage 271, and conveyed again to the CCD 229. After that, the document is guided by the switching guide 216 to the discharging document conveying passage 274 and discharged by the sheet-discharging roller 214 to the document sheet-discharging tray 215. In other words, when the back side of the document is read in the document reading operation in the double-sided reverse reading mode, the document is conveyed through the circular document conveying passage 278.

The CIS 231 is provided on the discharging document conveying passage 274. In other words, the CIS 231 is provided on the discharging document conveying passage 274 between the branching point at which the discharging document conveying passage 274 branches out from the reverse document conveying passage 272 and the document sheet-discharging tray 215. As shown in FIG. 3, the discharging document conveying passage 274 branches out from the reverse document conveying passage 272 and extends outside of the circular document conveying passage 278, and is connected to the document sheet-discharging tray 215. Therefore, the CIS 231 is provided outside of the loop formed by the circular document conveying passage 278.

In a case of the conventional image reading apparatus 2' shown in FIG. 4, the CIS 231 for reading a document back side is arranged inside the loop formed by the circular document conveying passage 278, the loop becomes large to secure a space for arranging the CIS 231, so that a document conveying distance at a time of performing an operation of reading the document back side in the double-sided reverse reading mode becomes relatively long. Accordingly, a time for reading both sides of a document in the double-sided reverse reading mode becomes long.

On the other hand, in the image reading apparatus 2 shown in FIG. 3 in accordance with an embodiment of the present invention, the CIS 231 is provided outside of the loop formed by the circular document conveying passage 278. Accordingly, when the document is conveyed in the document conveying passage 278 at the time of performing the operation of reading the document back side in the double-sided reverse reading mode, the document does not pass through the position at which the CIS 231 is provided. Providing no space for the CIS 231 inside the loop formed by the circular document conveying passage 278 as described above makes the loop of the circular document conveying passage 278 be small. Accordingly, in the image reading apparatus 2, a document conveying distance at a time of performing an operation of reading the document back side in the double-sided reversing mode becomes short, so that a long time becomes not necessary to read both sides of the document in the double-sided reverse reading mode.

Further, in the image reading apparatus 2, since the CIS 231 is provided outside of the loop formed by the circular document conveying passage 278, and a space for providing the CIS 231 can be easily secured, the CIS 231 can be attached and detached easily with respect to the image reading apparatus 2.

The present invention is not limited to the embodiment described above, and can be modified in various ways. For example, in the embodiment above, the CCD 229 is adopted as the first reading section which reads front and back sides of the document at the time of performing the operation of reading the document in the double-sided reverse reading mode or reads document sides at the time of performing an operation of reading a document in the double-sided simultaneous reading mode is described, and the CIS 231 is adopted as the second reading section which reads the document back side at a time of performing the operation of reading the document in the double-sided simultaneous reading mode. However, both the first and second reading section may be the CIS 231.

Further, in the description above, an embodiment of a configuration and a processing of the image reading apparatus and the image forming apparatus in accordance with the present invention is shown in FIGS. 1 through 3. However, this merely an example, and is not intended to limit the image reading apparatus and the image forming apparatus in accordance with the present invention to the configuration and control described above.

In summary, according to an aspect of the present invention, an image reading apparatus includes: a document feeding section which feeds a document placed on a document tray; a first reading section which reads one side of the document conveyed by the document feeding section; a reversing mechanism which reverses and conveys the document so that the other side of the document is to be read by the first reading section after the one side of the document is read; a document-discharging tray to which the document whose one or the other side is read by the first reading section is discharged; a first document conveying passage which guides the document conveyed from the document tray to the first reading section by the document feeding section; a reverse document conveying passage which guides the document conveyed from the first reading section to the reversing mechanism by the document feeding section; a re-conveying document conveying passage which connects the reversing mechanism and the first document conveying passage and guides the document conveyed from the reversing mechanism to the first document conveying passage by the document feeding section; a discharging document conveying passage which branches out from the reverse document conveying passage and guides the document which is conveyed to the document discharging tray by the document feeding section; and a second reading section which is provided in the discharging document conveying passage between a branching point and the document discharging tray and reads the other side of the document conveyed by the document feeding section.

Further, according to another aspect of the present invention, an image forming apparatus includes: a document feeding section which feeds a document placed on a document tray; a first reading section which reads one side of the document conveyed by the document feeding section; a reversing mechanism which reverses and conveys the document so that the other side of the document is to be read by the first reading section after the one side of the document is read; a document-discharging tray to which the document whose one or the other side is read by the first reading section is discharged; a first document conveying passage which guides the document conveyed from the document tray to the first reading section by the document feeding section; a reverse document conveying passage which guides the document conveyed from the first reading section to the reversing mechanism by the document feeding section; a re-conveying document conveying passage which connects the reversing mechanism and the first document conveying passage and guides the document conveyed from the reversing mechanism to the first document conveying passage by the document feeding section; a discharging document conveying passage which branches out from the reverse document conveying passage and guides the document which is conveyed to the document discharging tray by the document feeding section; a second reading section which is provided in the discharging document conveying passage between a branching point and the document discharging tray and reads the other side of the document conveyed by the document feeding section; and an image forming section which forms an image on a recording sheet based on image data read by the first reading section and the second reading section.

According to the invention, the second reading section capable of reading the other side of a document at the time when the simultaneous document reading is performed is provided inside the discharging document conveying passage between the branching point from the reverse document conveying passage and the document sheet-discharging tray. Accordingly, the second reading section is provided at a position out of the document conveying passage for re-conveying the document to the first reading section after the document read by the first reading section is reversed front and back. Accordingly, it is not necessary to provide a space for arranging the second reading section on the document conveying passage for re-conveying the document to the first reading section, and the document conveying passage for re-conveying the document to the first reading section can be made short. Therefore, even in the case where the operation of reversing front and back and reading both sides of a document with the first reading section is performed, a long time is not requested to read the document, and both sides of the document can be read simultaneously with the first and second reading sections.

Further, according to an aspect of the present invention, a circular document conveying passage is formed by the first document conveying passage, the reverse document conveying passage, and the re-conveying document conveying passage, and the discharging document conveying passage branches out from the reverse document conveying passage, extends outside of the circular document conveying passage, and is connected to the sheet-discharging tray.

According to this invention, the discharging document conveying passage in which the second reading section is provided branches out from the reverse document conveying passage, and extends outward from the circular document conveying passage to be connected to the sheet-discharging tray. Accordingly, the second reading section is provided outside of the loop formed by the first document conveying passage, the reverse document conveying passage, and the re-conveying document conveying passage. Accordingly, it is not necessary to provide a space for arranging the second reading section inside the circular document conveying passage for re-conveying the first reading section, i.e. the loop formed by the document conveying passage for re-conveying the document to the first reading section, and the loop can be configured to be small. Therefore, even in the case where the operation of reversing front and back and reading both sides of a document with the first reading section is performed, a long time is not requested to read the document, and both sides of the document can be read simultaneously with the first and second reading sections.

Further, according to an aspect of the present invention, the second reading section is provided detachably with respect to the discharging document conveying passage.

According to the image reading apparatus or the image forming apparatus according to the present invention, in view that both sides of the document can be read only with the first reading section, the second reading section can be attached later or detached as needed, such as adding to or omitting the second reading section from the image reading apparatus or the image forming apparatus. Further, in a step of manufacturing the image reading apparatus or the image forming apparatus, an apparatus having a common configuration for the cases of providing or not providing the second reading section to the main body of the image reading apparatus or the image forming apparatus. Accordingly, cost for manufacturing the image reading apparatus or the image forming apparatus can be reduced.

Further, according to the present invention, the first reading section reads the one side of the document with a minification optical system image sensor, and the second reading section reads the other side of the document with a contact optical system image sensor.

According to the invention, since the first reading section sued for reading both sides of the document is a minification optical system image sensor, if both sides of the document is reversed front and back and read with the first reading section, no difference occurs in colors of read images of both sides of the document, and further the color image can be read in a high quality. Further, since the second reading section which reads the other side of the document is a contact optical system image sensor, the second reading section can be provided in a relatively small space without requiring such a large space required for providing the minification optical system image sensor. Accordingly, the document conveying passage for re-conveying the document to the first reading section can be configured to be small.

This application is based on Japanese Patent application serial No. 2007-252484 filed in Japan Patent Office on Sep. 27, 2007, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image reading apparatus, comprising:
a document tray on which a document is placed;
a reading window;
a first document conveying passage that guides the document from the document tray to the reading window;
a first reading section which reads the document at the reading window;
a reversing mechanism which reverses and conveys the document so that, after one side of the document is read by the first reading section, the other side of the document is to be read by the first reading section;
a document-discharging tray to which the document whose one or the other side is read by the first reading section is discharged;
a reverse document conveying passage which guides the document from the reading window to the reversing mechanism;
a re-conveying document conveying passage which connects the reversing mechanism and the first document conveying passage and guides the document from the reversing mechanism to the first document conveying passage;
a discharging document conveying passage which branches out from the reverse document conveying passage and guides the document to the document discharging tray;
a switching guide provided at a branching position between the reverse document conveying passage and the discharging document conveying passage, the switching guide performing switching to guide the document to the reversing mechanism or the document discharging tray; and
a second reading section which is provided in the discharging document conveying passage between the switching guide and the document discharging tray and reads the other side of the document guided to the document discharging tray.

2. The image reading apparatus according to claim 1, wherein
a circular document conveying passage is formed by the first document conveying passage, the reverse document conveying passage, and the re-conveying document conveying passage,
the discharging document conveying passage branches out from the reverse document conveying passage, extends outside of the circular document conveying passage, and is connected to the sheet-discharging tray, and
the second reading section is provided outside of the circular document conveying passage.

3. The image reading apparatus according to claim 2, wherein the second reading section is provided detachably with respect to the discharging document conveying passage.

4. The image reading apparatus according to claim 1, wherein
the first reading section reads the one side of the document with a minification optical system image sensor, and
the second reading section reads the other side of the document with a contact optical system image sensor.

5. The image reading apparatus according to claim 1, wherein
the second reading section is provided between the discharging document conveying passage and the reverse document conveying passage.

6. The image reading apparatus according to claim 5, wherein
the second reading section is provided above the discharging document conveying passage and below the reverse document conveying passage.

7. The image reading apparatus according to claim 1, wherein
the reading window, the switching guide and the second reading section are provided in sequence along a document conveying direction.

8. The image reading apparatus according to claim 1, wherein
the reversing mechanism includes a reversing roller which is disposed downstream of the switching guide.

9. The image reading apparatus according to claim 1, wherein
the second reading section is disposed at a place where the document conveyed from the document tray to the document-discharging tray can pass through only once.

10. An image forming apparatus, comprising:
a document tray on which a document is placed;
a reading window;
a first document conveying passage that guides the document from the document tray to the reading window;
a first reading section which reads the document at the reading window;
a reversing mechanism which reverses and conveys the document so that, after one side of the document is read by the first reading section, the other side of the document is to be read by the first reading section;
a document-discharging tray to which the document whose one or the other side is read by the first reading section is discharged;
a reverse document conveying passage which guides the document from the reading window to the reversing mechanism;
a re-conveying document conveying passage which connects the reversing mechanism and the first document conveying passage and guides the document from the reversing mechanism to the first document conveying passage;
a discharging document conveying passage which branches out from the reverse document conveying passage and guides the document to the document discharging tray;
a switching guide provided at a branching position between the reversing document conveying passage and the discharging document conveying passage, the switching guide performing switching to guide the document to the reversing mechanism or the document discharging tray;
a second reading section which is provided in the discharging document conveying passage between the switching guide and the document discharging tray and reads the other side of the document guided to the document discharging tray; and
an image forming section which forms an image on a recording sheet based on image data read by the first reading section and the second reading section.

11. The image forming apparatus according to claim 10, wherein
a circular document conveying passage is formed by the first document conveying passage, the reverse document conveying passage, and the re-conveying document conveying passage,
the discharging document conveying passage branches out from the reverse document conveying passage, extends outside of the circular document conveying passage, and is connected to the sheet-discharging tray, and
the second reading section is provided outside of the circular document conveying passage.

12. The image forming apparatus according to claim 10, wherein the second reading section is provided detachably with respect to the discharging document conveying passage.

13. The image forming apparatus according to claim 12, wherein
the first reading section reads the one side of the document with a minification optical system image sensor, and
the second reading section reads the other side of the document with a contact optical system image sensor.

* * * * *